United States Patent [19]

Inoue et al.

[11] Patent Number: 4,728,873
[45] Date of Patent: Mar. 1, 1988

[54] AUTOMATIC SEAT POSITION ADJUSTING ASSEMBLY

[75] Inventors: Masataka Inoue; Masahito Mutoh, both of Toyota; Tomoaki Katayama, Nagoya, all of Japan

[73] Assignee: Toyota Jidosha Kabushiki Kaisha, Japan

[21] Appl. No.: 53,125

[22] Filed: May 22, 1987

[30] Foreign Application Priority Data

Jul. 28, 1986 [JP] Japan .................................. 61-177328

[51] Int. Cl.⁴ .............................................. G05B 9/02
[52] U.S. Cl. ................................... 318/568; 318/603; 318/466; 307/10 R; 340/52 R
[58] Field of Search ............... 307/9, 10 R; 340/52 R; 318/344, 345, 346, 599, 601, 603, 608, 565, 566, 567, 568 R, 466, 467

[56] References Cited

U.S. PATENT DOCUMENTS

| | | | |
|---|---|---|---|
| 4,267,494 | 5/1981 | Matsuoka et al. | 318/568 |
| 4,401,928 | 8/1983 | Kamijo et al. | 318/466 |
| 4,467,252 | 8/1984 | Takeda et al. | 318/603 |
| 4,660,140 | 4/1987 | Illg | 318/568 X |
| 4,682,088 | 7/1987 | Sullivan | 318/603 X |
| 4,689,537 | 8/1987 | Mizuta et al. | 318/603 X |

OTHER PUBLICATIONS

Japanese Patent Laid Open No. Showa 60-104432.

Primary Examiner—William M. Shoop, Jr.
Assistant Examiner—Paul Ip
Attorney, Agent, or Firm—Parkhurst & Oliff

[57] ABSTRACT

A seat assembly for automatically adjusting a seat position of a seat mounted, for example, in a vehicle, includes an actuator, an electric source, a controller, a non-operation maintainer, a stop lamp switch and a cancellation switch. The actuator adjusts the seat, and the electric source supplies electricity to the actuator.

The controller controls the actuator and outputs a controlling signal to the actuator.

The non-operation maintainer maintains a non-operation condition of the actuator and the non-operation maintainer is electrically connected between the actuator and the electric source. The non-operation maintainer selectively supplies the electricity to the actuator.

The stop lamp switch outputs a stop signal to the non-operation maintainer, and the non-operation maintainer starts maintaining the non-operation condition of the controller in accordance with the receipt of the stop signal.

The cancellation switch outputs a cancellation signal to the non-operation maintainer, and the non-operation maintainer cancels the non-operation condition of the actuator in accordance with the receipt of the cancellation signal.

20 Claims, 12 Drawing Figures

AUTOMATIC SEAT POSITION ADJUSTING ASSEMBLY

BACKGROUND OF THE INVENTION

The present invention relates to an automatic seat position adjusting assembly which can memorize a suitable seat position for an operator, and which can adjust automatically a seat position to the memorized suitable seat position even when the seat was previously displaced. The automatic seat position adjusting assembly includes a longitudinal seat adjusting mechanism, a seat recliner adjusting mechanism, a front portion lifting mechanism, a rear portion lifting mechanism, a controller means and a manual switch. Movement of these adjusting mechanisms is controlled by the controller means in accordance with an operation of the manual switch.

More particularly, the present invention relates to improvements in the controller means of the automatic seat position adjusting assembly.

A conventional automatic seat position adjusting assembly is disclosed in Japanese Patent Application Laid-open No. Show a 60-104432. This Japanese patent application discloses a controller means of the automatic seat position adjusting assembly. The controller means prevents a memory means from memorizing undesirable seat positions, so that the controller means prevents a motor for adjusting a position of a seat from damage by an undesirable adjustment of seat position.

However, when the controller means receives an undesirable output signal (e.g., when a vehicle speed sensor is damaged by a break of a connecting wire) the conventional automatic seat position adjusting assembly automatically adjusts the seat position in accordance with the received undesirable signal.

SUMMARY OF THE INVENTION

The present invention was developed in view of the foregoing background and to overcome the foregoing drawbacks. It is accordingly an object of this invention to provide an automatic seat position adjusting assembly which can prevent an undesirable adjustment and maintain a non-operation condition of an actuator means without a continuous operation of a stop switch, even when a controller means of the automatic seat position adjusting assembly receives a continuous undesirable signal.

To achieve secure prevention of the undesirable adjustment and secure maintaining of the non-operation condition of the actuator means, the automatic seat position adjusting assembly includes the actuator means, an electric source, the controller means, a non-operation maintaining means, a stop signal generating means and a cancellation signal generating means.

The actuator means adjusts a seat mounted on a vehicle.

The electric source supplies electricity with the actuator means.

The controller means controls the actuator means and the controller means outputs a control signal to the actuator means.

The non-operation maintaining means maintains a non-operation condition of the actuator means, and the non-operation maintaining means is electrically connected between the actuator means and the electric source. The non-operation maintaining means selectively supplies the electricity to the actuator means.

The stop signal generating means outputs a stop signal to the non-operation maintaining means, and the non-operation maintaining means starts maintaining the non-operation condition of the actuator means in accordance with the receipt of the stop signal. Accordingly, once the stop signal generating means outputs the stop signal to the non-operation maintaining means, the non-operation maintaining means maintains the non-operation condition of the actuator means.

The cancellation signal generating means outputs a cancellation signal to the non-operation maintaining means, and the non-operation maintaining means cancels the non-operation condition of the actuator means in accordance with the receipt of the cancellation signal. Accordingly, the cancellation signal generating means outputs the cancellation signal to the non-operation maintaining means, the non-operation maintaining means cancels the non-operation condition of the actuator means. Further, the electric source supplies the electricity to the actuator means, and the actuator means adjusts the seat in accordance with the controlling signal of the controller means.

Therefore, the automatic seat position adjusting assembly can prevent the undesirable adjustment by an operation of the stop signal generating means, and maintain the non-operation condition of the actuator means without the continuous operation of the stop switch, even when the controller means receives the continuous undesirable signal.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENTS

The present invention will be described in detail with reference to the accompanying drawings which illustrate preferred different embodiments according to the present invention.

Figure 1:
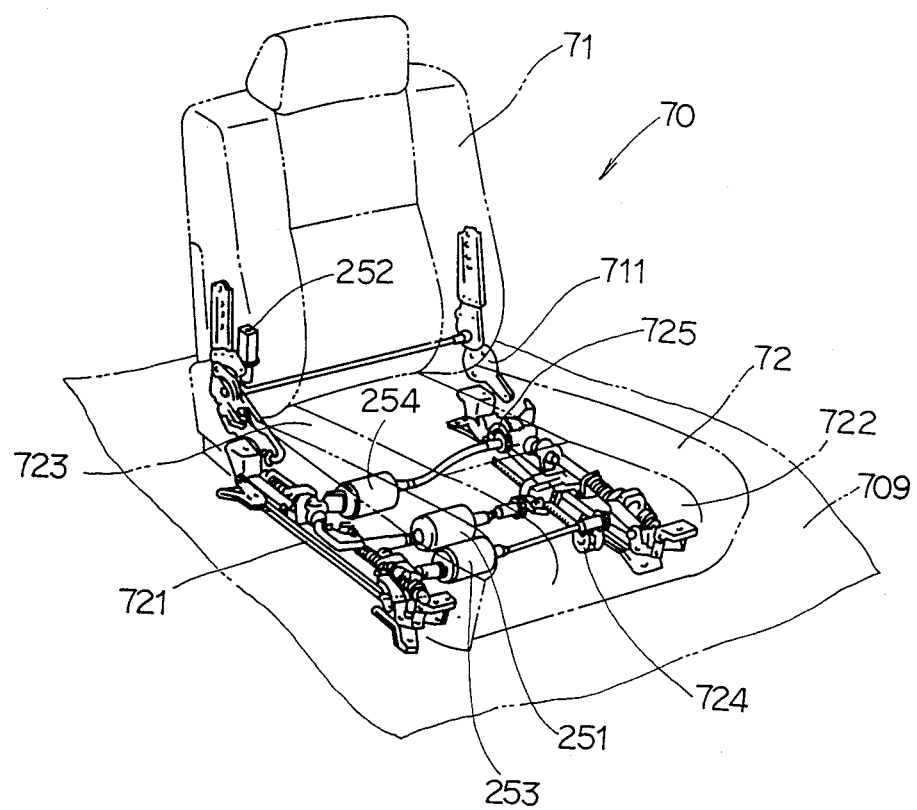
FIG. 1 is a perspective view of a seat equipped with an automatic seat position adjusting assembly according to the present invention, wherein first through fourth seat position adjusting mechanisms are equipped in the seat.

Referring to FIG. 1, a seat 70 is mounted on a floor member 709 of a vehicle. The seat 70 includes a seat cushion 72 and a seat back 71. The seat cushion 72 is dlidably mounted on the floor member 709 through a longitudinal seat adjusting mechanism 721, and the seat cushion 72 is displaceable in the longitudinal direction of a vehicle. The longitudinal seat adjusting mechanism 721 automatically adjusts a longitudinal seat position of the seat cushion 72 by a first motor 251 of an automatic seat position adjusting assembly.

The seat back 71 is rotatably mounted on the seat cushion 72 through a seat recliner adjusting mechanism 711. The seat recliner adjusting mechanism 711 automatically adjusts a seat reclining position of the seat back 71 by a second motor 252 of the automatic seat position adjusting assembly.

A front portion 722 of the seat cushion 72 is lifted in the vertical direction of the vehicle by a front portion lifting mechanism 724.

The front portion lifting mechanism 724 automatically adjusts a front vertical position of the seat cushion 72 by a third motor 253 of the automatic seat position adjusting assembly.

A rear portion 723 of the seat cushion 72 is lifted in the vertical direction of the vehicle by a rear portion lifting mechanism 725. The rear portion lifting mechanism 725 automatically adjusts a rear vertical position of the seat cushion 72 by a fourth motor 254 of the automatic seat position adjusting assembly.

Figure 2:
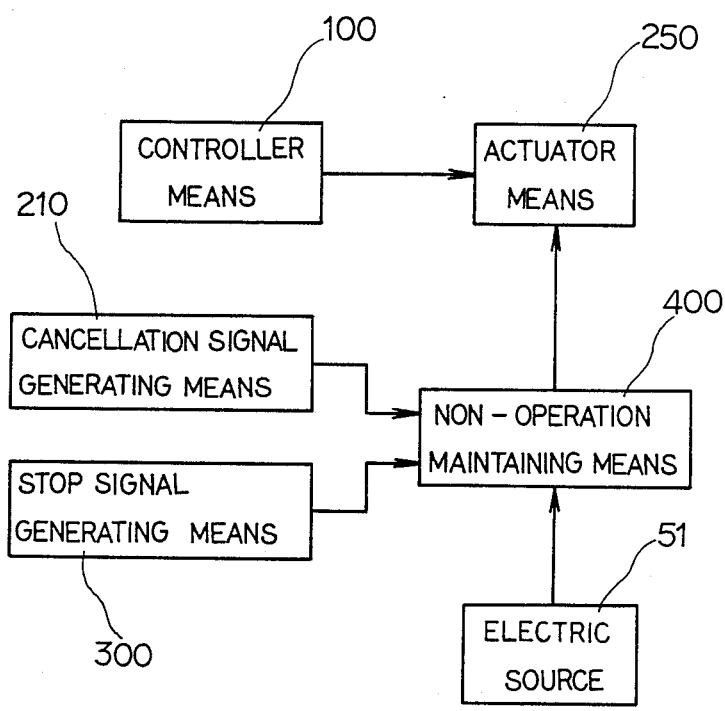
FIG. 2 is a block diagram of the present invention.

As shown in FIG. 2, the automatic seat position adjusting assembly includes an electric source 51, a controller means 100, a cancellation signal generating means 210, an actuator means 250, a stop signal generating means 300 and a non-operation maintaining means 400.

The controller means 100 controls the first through fourth motors 251 through 254 of the actuator means 250 to automatically position the seat 70 at a memorized suitable seat position. The actuator means 250 is connected to the controller means 100, and the non-operation maintaining means 400 are electrically connected between the actuator means 250 and the electric source 51. The stop signal generating means 300 and the cancellation signal generating means 210 are connected to the non-operation maintaining means 400.

When the stop signal generating means 300 outputs a stop signal to the non-operation maintaining means 400, the non-operation maintaining means 400 starts and continuously prevents the actuator means 250 from adjusting the seat 70 at the memorized suitable seat position, even when the controller means 100 outputs a controlling signal to the actuator means 250. On the other hand, when the cancellation signal generating means 210 outputs a cancellation signal to the non-operation maintaining means 400, the non-operation maintaining means 400 makes the actuator means 250 adjust the seat 70 at the memorized suitable seat position in accordance with the controlling signal outputted from the controller means 100, even when the stop signal generating means 300 continuously outputs the stop signal to the non-operation maintaining means 400.

Figure 3:
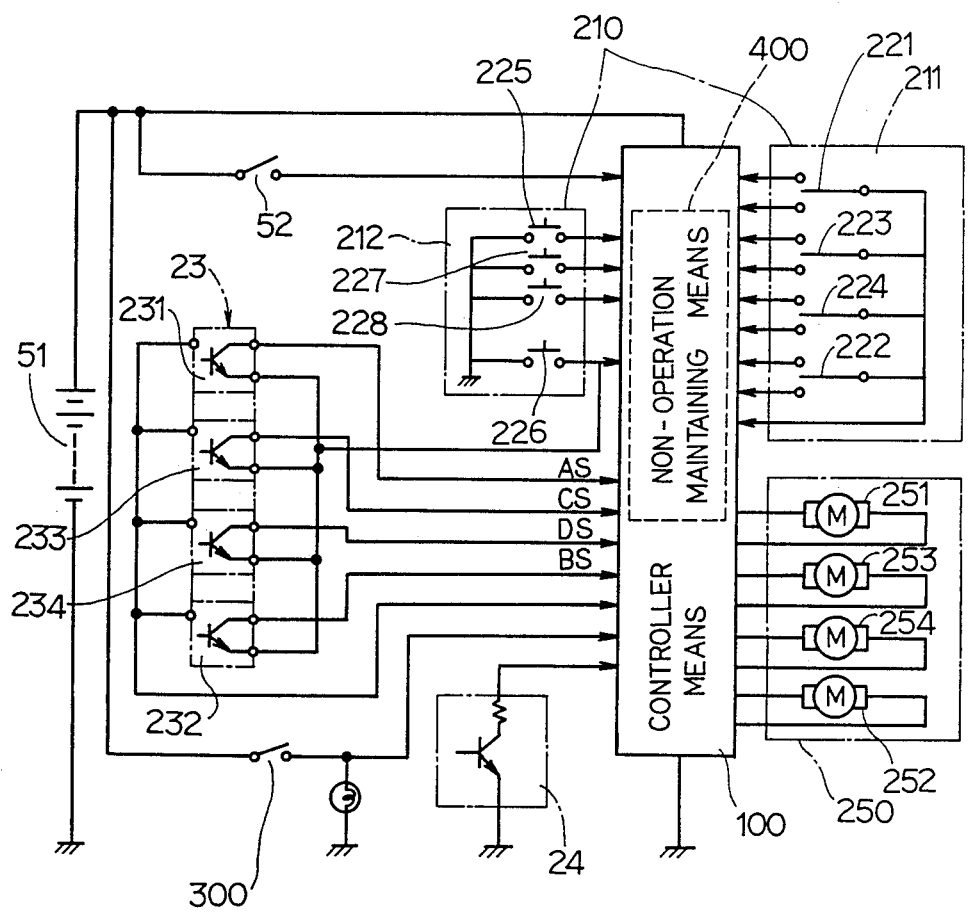
FIG. 3 is a schematic circuit illustrating a first embodiment of the present invention.

As shown in FIG. 3, the cancellation signal generating means 210 include manual switches 211 and reproduction switches 212. The manual switches 211 include first through fourth switches 221 through 224. The reproduction switches 212 include first through fourth reproduction switches 225 through 228. Each of the first through fourth reproduction switches 225 through 228 corresponds to each of the first through fourth switches 221 through 224 respectively.

Each of the first through fourth switches 221 through 224 of the manual switches 211 includes first and second fixed terminals and a movable contact, and the first and second fixed terminal are electrically connected to non-operation maintaining means 400. When the movable contact of the first switch 221 is in contact with the first fixed terminal, the first motor 251 rotates in the clockwise direction and the seat cushion 72 is displaced forward in the longitudinal direction of the vehicle. On the other hand, when the movable contact of the first switch 221 is in contact with the second fixed terminal, the first motor 251 rotates in counter-clockwise direction and the seat cushion 72 is displaced backward in the longitudinal direction of the vehicle.

As a result, an operator selects a suitable longitudinal seat position in the longitudinal direction of the vehicle by the operation of the first switch 221.

In a similar manner, when the second switch 222 is manually operated, the seat back 71 swings selectively forward or backward on the seat cushion 72, and an operator selects a suitable seat reclining position of the seat back 71 by the operation of the second switch 222. When the third switch 223 is manually operated, the front portion 722 of the seat cushion 72 is selectively displaced upwardly or downwardly in the vertical direction of the vehicle, and an operator selects a suitable front vertical position of the front portion 722 of the seat cushion 71 by the operation of the third switch 223. When the fourth switch 224 is manually operated, the rear portion 723 of the seat cushion 72 is selectively displaced upwardly or downwardly in the vertical direction of the vehicle, and an operator selects a suitable rear vertical position of the rear portion 723 of the seat cushion 72 by the operation of the fourth switch 224.

Each of the first through fourth reproduction switches 225 through 228 memorizes the suitable seat position selected by the operation of each of the first through fourth switches 221 through 224. Once the selected suitable seat position is memorized, the controlling means 100 adjusts a seat 70 to the selected suitable seat position by an operation of each of the first through fourth reproduction switches 225 through 228. Accordingly, even when the positions of the seat 70 are displaced, an operator obtains the selected suitable seat positions by the operations of the reproduction switches 212.

The reproduction switches 212 are electrically connected to the controller means 100.

Further, the first through fourth motor 251 through 254 are electrically connected to the controller means 100.

Seat position sensors 23 detect the positions of the seat 70. A first position sensor 231 detects an amount of sliding of the seat cushion 72 in the longitudinal direction of the vehicle, and outputs a first signal "AS" to the controller means 100. A second position sensor 232 detects an amount of reclining of the seat back 71, and outputs a second signal "BS" to the controller means 100. A third position sensor 233 detects an amount of lifting of the front portion of the seat cushion 72, and outputs a third signal "CS" to the controller means 100. A fourth position sensor 234 detects an amount of lifting of the rear portion of the seat cushion 72, and outputs a fourth signal "DS" to the controller means 100.

Furthermore, an ignition switch 52, a stop lamp switch 300 as the stop signal generating means and a vehicle speed sensor 24 are electrically connected to the controller means 100. A battery 51 as the electric source is connected to the non-operation maintaining means 400. The controller means 100 receives signals from the manual switches 211, the reproduction switches 212, the position sensors 23 and the vehicle speed sensor 24, and controls the first through fourth motors 251 through 254 to automatically position the seat 70 at the selected suitable positions. The non-operation maintaining means 400 receives signals from the manual switches 211, the reproduction switches 212, and the stop lamp switch 300.

The stop lamp switch 300 is electrically connected to the battery 51 and the non-operation maintaining means 400, and is operated in accordance with a displacement of a foot brake (not shown in the drawings). When the foot brake is operated, the stop lamp switch 300 is turned on and outputs a logic level "1" stop signal to the non-operation maintaining means 400. When the ignition switch 52 is turned on, a constant voltage circuit (not shown in the drawings) is connected to the battery 51, and a constant voltage (i.e., 5 V) is supplied with a plurality of components of the controller means 100 and the non-operation maintaining means 400.

Figure 4:
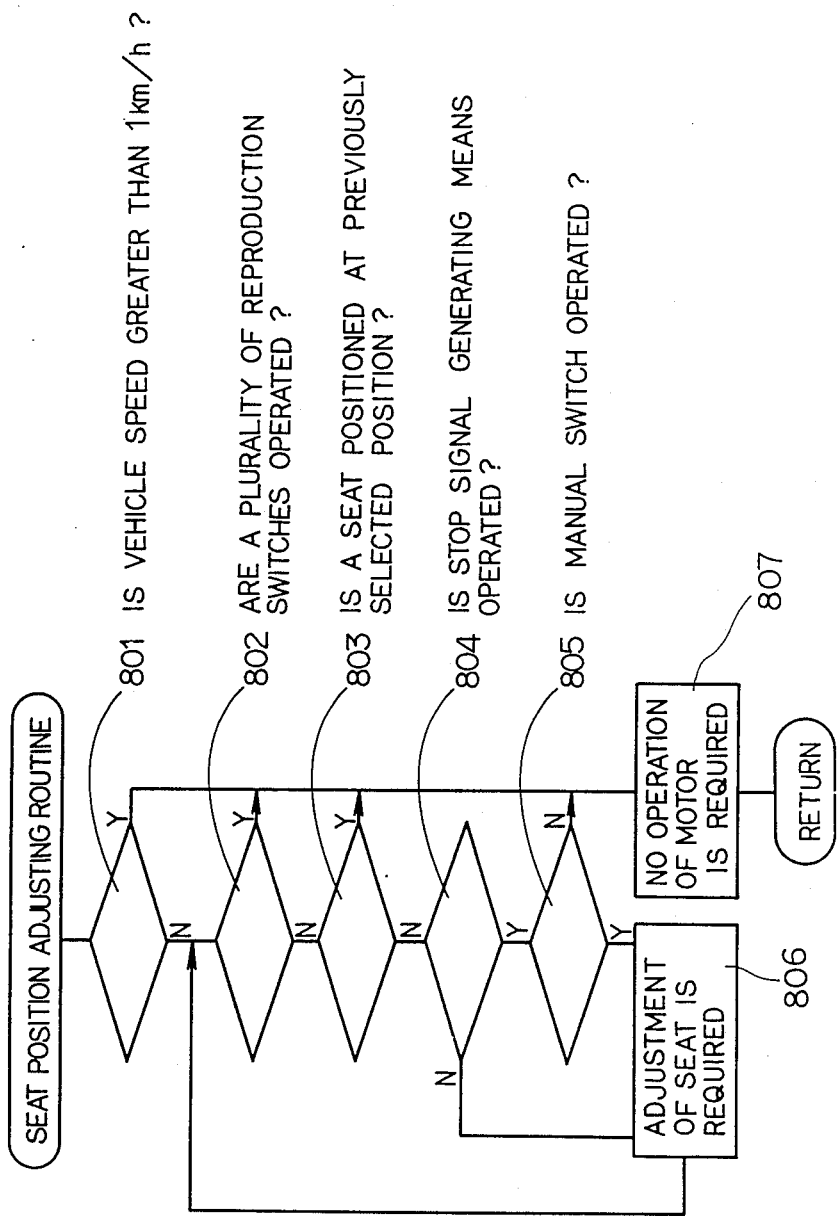
FIG. 4 is a flow chart of a seat position adjusting routine according to the present invention.

FIG. 4 shows a flow chart of a seat position adjusting routine. After the ignition switch 52 is turned on, the seat position adjusting routine is processed. First of all, a first step 801 determines whether vehicle speed is greater than 1 km/h. When the first step 801 determines that the vehicle speed is geater than 1 km/h, a seventh through 254 is required. On the other hand, when the first step 801 determines that the vehicle speed is not greater than 1 km/h, a second step 802 is processed.

The second step 802 determines whether a plurality of reproduction switches 212 are operated. When the second step 802 determines that the plurality of reproduction switches 212 are operated, the seventh step 807 is processed. On the other hand, when the second step 802 determines that the plurality of reproduction switches 212 are not operated, a third step 803 is processed.

The third step 803 determines whether the seat 70 is positioned at the selected suitable position. When the third step 803 determines that the seat 70 is positioned at the selected suitable position, the seventh step 807 is processed. On the other hand, when the third step 803 determines that the seat 70 is not positioned at the selected suitable position, a fourth step 804 is processed.

The fourth step 804 determines whether the stop signal generating means 300 is operated. When the fourth step 804 determines that the stop signal generating means 300 is not operated, a sixth step 806 is processed. As a result, an adjustment of the seat is required, and the first through fourth motors 251 through 254 are actuated in accordance with the controlling signal outputted from the controller means 100.

On the other hand, when the fourth step 804 determines that the stop signal generating means 300 is operated, a fifth step 805 is processed.

The fifth step 805 determines whether one of the manual switches 211 is operated. When the fifth step 805 determines that any of the manual switches 211 is not operated, the seventh step 807 is processed. On the other hand, when the fifth step 805 determines that one of the manual switches 211 is operated, the sixth step 806 is processed.

After the sixth step 806 is processed, the second step 802 is processed again.

Figure 5:
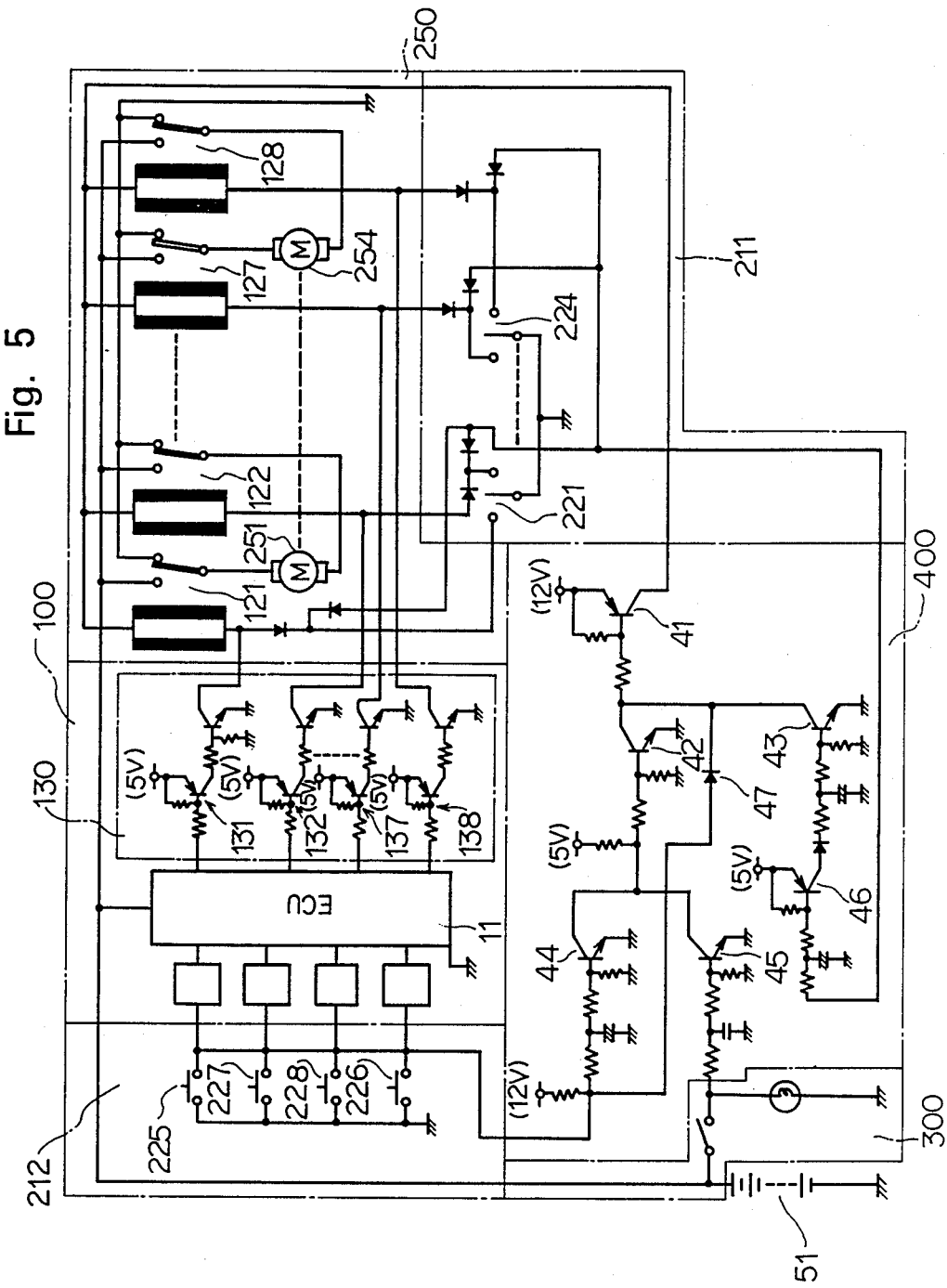
FIG. 5 is a schematic circuit illustrating a control circuit and a non-operation maintaining means of the present invention.

FIG. 5 shows the controller means 100 and the non-operation maintaining means 400 in detail. The controller means 100 includes an electric control unit "ECU" 11, first through eighth relays 121 through 128 and first through eighth actuator circuits 131 through 138.

Each of the first through eighth actuator circuits 131 through 138 corresponds respectively to each of the first through eighth relays 121 through 128. The first and second relays 121 and 122 are electrically connected to the first motor 251, and each of the first and second relays 121 and 122 includes a movable contact and a pair of fixed terminals. In a normal condition (i.e., when both of the first and second relays 121 and 122 are not actuated), the movable contacts of the first and second relays 121 and 122 are connected to the ground. The movable contacts of the first and second relays 121 and 122 are connected to the first motor 251. A first terminal of each of the first through eighth relays 121 through 128 is electrically connected to each of the first through eighth actuator circuits 131 through 138 and one of the fixed terminals of each of the first through fourth manual switches 221 through 224. Further, a second terminal of the actuator is electrically connected to the battery 51 through the non-operation maintaining means 400 and the stop lamp switch 300.

When the first relay 121 is actuated, the first motor 251 rotates in the clockwise direction. On the other hand, when the second relay is actuated, the first motor 251 rotates in the counter-clockwise direction.

Further, in a normal condition, the movable contact of the first switch 221 of the manual switch 211 is positioned at a neutral position (i.e., the movable contact is not in contact with both of the fixed terminals).

In a similar manner, the movable contact of each of the third through eighth relays 123 through 128 are connected to the ground in the normal condition. The movable contacts of the second through fourth switches 222 through 224 of the manual switch 211 are positioned at the neutral position in the normal condition.

The non-operation maintaining means 400 includes first through sixth transistors 41 through 46, resistors, condensers and at least a diode 47. The first transistor 41 is electrically connected to the second terminals of the actuators of the first through eighth relays 121 through 128. A base terminal of the first transistor 41 is connected to collector terminals of the second and third transistors 42 and 43. The base terminal of the fourth transistor 44 is connected to the reproduction switches 212. The base terminal of the fifth transistor 45 is connected to the stop lamp switch 300. The sixth transistor 46 is connected to the manual switches 211.

The constant voltage circuit supplies the constant voltage (i.e., 5 V) with a plurality of terminals "5 V". The battery 51 supplies the constant voltage (i.e., 12V) with a plurality of terminals "12 V".

An operation of the automatic seat position adjusting assembly according to the present invention is disclosed hereinafter.

If the ECU 11 functions irregularly or if the vehicle speed sensor 24 is damaged (i.e., in an irregular condition), the ECU 11 could not output adequate signals and the ECU 11 would output irregular signals to the first through eighth actuator circuits 131 through 138.

As a result, the automatic seat position adjusting assembly would automatically adjust the seat 70 to an undesired seat position which is not previously selected.

In this irregular condition, when an operator feels the movement of the seat 70 and when an operator operates the foot brake, the stop lamp switch 300 is turned on. As a result, the fifth transistor 45 of the non-operation maintaining means 400 turns on and the second and first transistors 42 and 41 are turned off in order. Accordingly, electricity is not supplied with the relays 121 through 128 of the controller means 100 from the battery 51.

Therefore, even when any irregular signals are outputted from the ECU 11 to the actuator circuits 131 through 138, the relays 121 through 128 are not actuated and the motors 251 through 254 do not rotate in a non-operation condition. Then, the movement or adjustment of the seat 70 are securely prevented.

Further, in the non-operation condition, when the foot brake is not operated and when the stop lamp switch 300 is turned off, the second transistor 42 is continuously turned off. Because a collector potential of the second transistor 42 reaches a high level and the fourth transistor 44 turns on, simultaneously, a base potential of the second transistor 42 reaches a low level.

In the non-operation condition, when one of manual switches 221 through 224 is operated, a base terminal of the sixth transistor 46 is connected to the ground, so that the sixth and third transistors 46 and 43 turn on in order. As a result, the first transistor 41 turns on and the electricity is supplied with the relays 121 through 128 from the battery 51.

In a similar manner, when one of the reproduction switches 225 through 228 is operated, a base terminal of the fourth transistor 44 is connected to the ground, so that the fourth transistor 44 turns off and the second transistor 42 turns on in order. As a result, the first transistor 41 turns on and the electricity is supplied to the relays 121 through 128 from the battery 51.

Even when the stop lamp switch 300 is turned on and the second transistor 42 turns off, once one of the manual switches 221 through 224 is operated, the first transistor 41 turns on. As a result, the seat 70 is preferentially adjustable by the operation of the manual switch 211, even when the foot brake is continuously operated.

Figure 6:
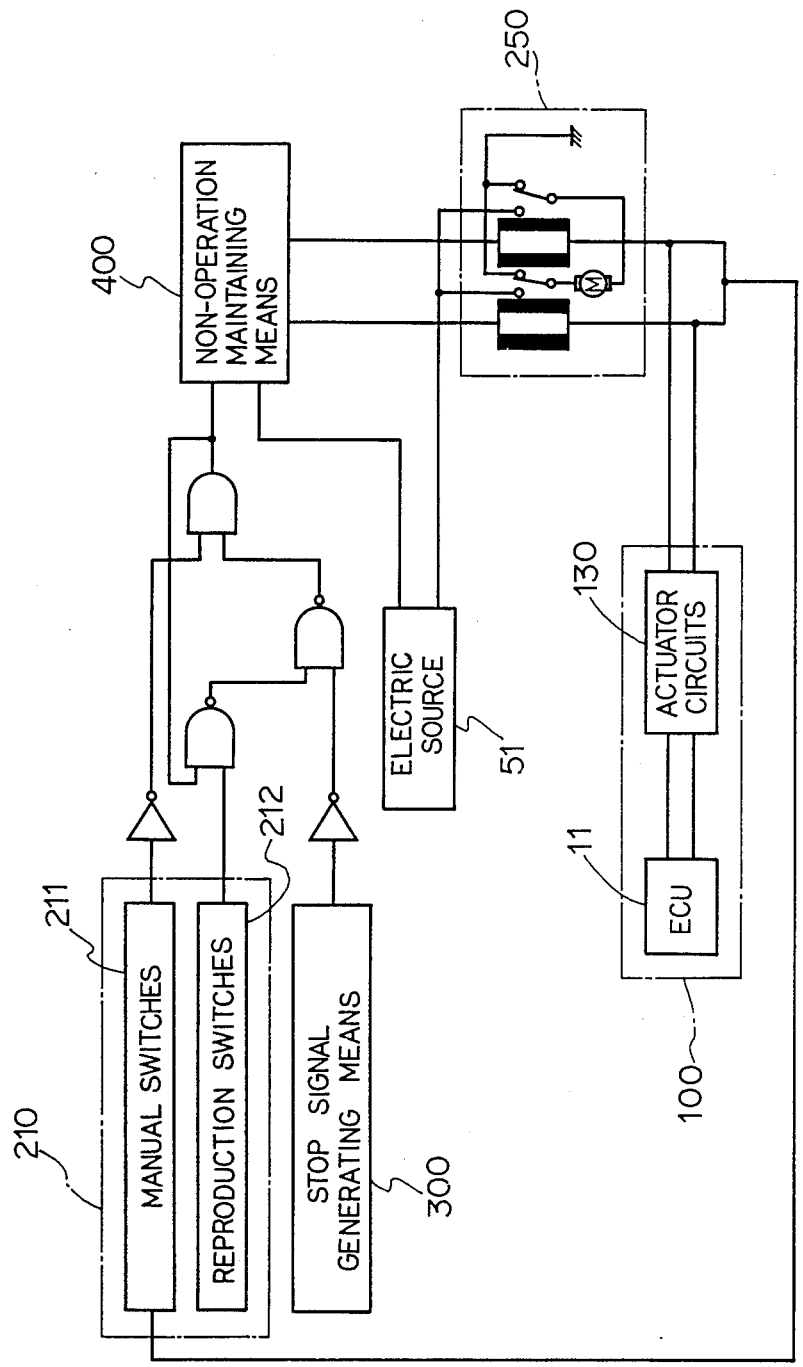
FIG. 6 is a logic diagram of the first embodiment according to the present invention.

As shown in FIG. 6, in a normal operation condition, the electricity is supplied with the relays through the non-operation maintaining means 400. When the ECU 11 outputs any signals to the actuator circuits 130, the seat 70 is automatically adjusted to the selected suitable seat position.

However, when the foot brake is operated, the manual switches 211 are not operated and the reproduction switches 212 are not operated, (i.e., when a logic level "1" stop signal is outputted from the stop signal generating means 300 to the non-operation maintaining means 400, the manual switches 211 do not output a logic level "1" operation signal and the reproduction switches 212 do not output a logic level "0" reproduction signal) and the non-operation maintaining means 400 does not supply the electricity with the relays (i.e., the non-operation maintaining means 400 continuously maintains the non-operation condition of the actuator means 250).

On the other hand, when the manual switches 211 or the reproduction switches 212 are operated, (i.e., when the logic level "1" operation signal or the logic level "0" reproduction signal is outputted from the manual switches 211 or the reproduction switches 212 to the non-operation maintaining means 400) the non-operation maintaining means 400 supplies the electricity with the relays 121 through 128 (i.e., the non-operation maintaining means 400 maintains an operation condition of the actuator means 250). As a result, the seat 70 is automatically adjusted by the motors.

Accordingly, an operator can easily start and continuously maintain the non-operation condition only by the operation of the foot brake, so that it is not necessary for an operator to operate any other operation in order to continuously maintain the non-operation condition of the automatic seat position adjusting assembly.

It is apparent to those skilled in the art that the automatic seat position adjusting assembly may include a second stop signal generating means equipped with an automatic transmission mechanism instead of the stop lamp switch 300. The second stop signal generating means can detect a position of a shift lever of the automatic transmission mechanism, and the second stop signal generating means outputs a stop signal when the shift lever is positioned at any position except a parking position and a neutral position.

In a similar manner, a third stop signal generating means is used instead of the stop lamp switch 300. The third stop signal generating means detects a position of a parking brake lever and outputs a stop signal when the parking brake lever is not operated.

A fourth stop signal generating means is used instead of the stop lamp switch 300. The fourth stop signal generating means detects an operation condition of an acceleration pedal and outputs a stop signal when the aceleration pedal is operated.

A fifth stop signal generating means is used instead of the stop lamp switch 300. The fifth stop signal generating means detects the vehicle speed and outputs a stop signal when the vehicle speed is not zero.

It is also apparent to those skilled in the art that the automatic seat position adjusting assembly includes any combination of anything selected from the group consisting of the stop lamp signal 300 and the second through fifth stop signal generating means.

Figure 7:
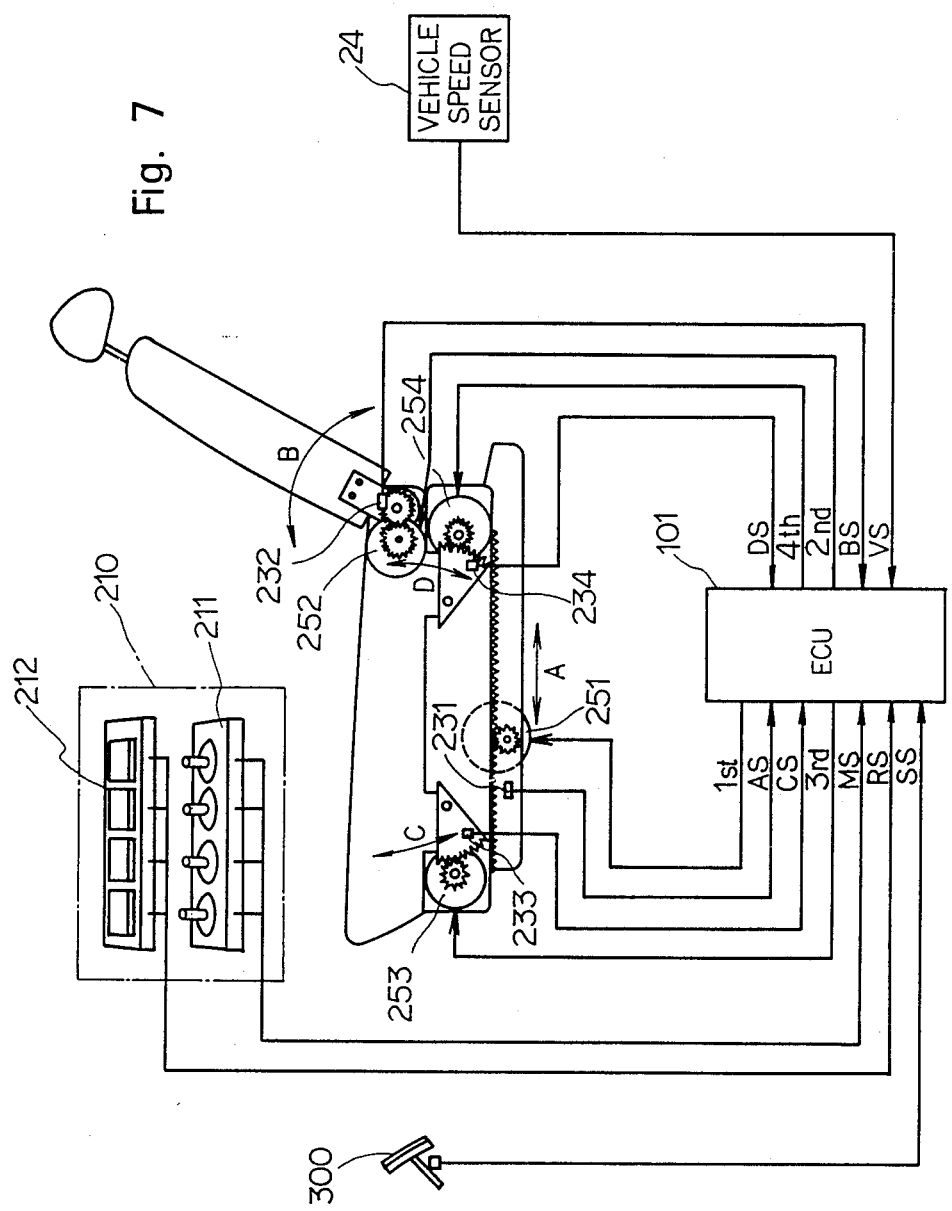
FIG. 7 is a schematic view of the automatic seat position adjusting assembly of a second embodiment according to the present invention, wherein sensors, switches and motors are electrically connected to an electric control unit.
Figure 8:
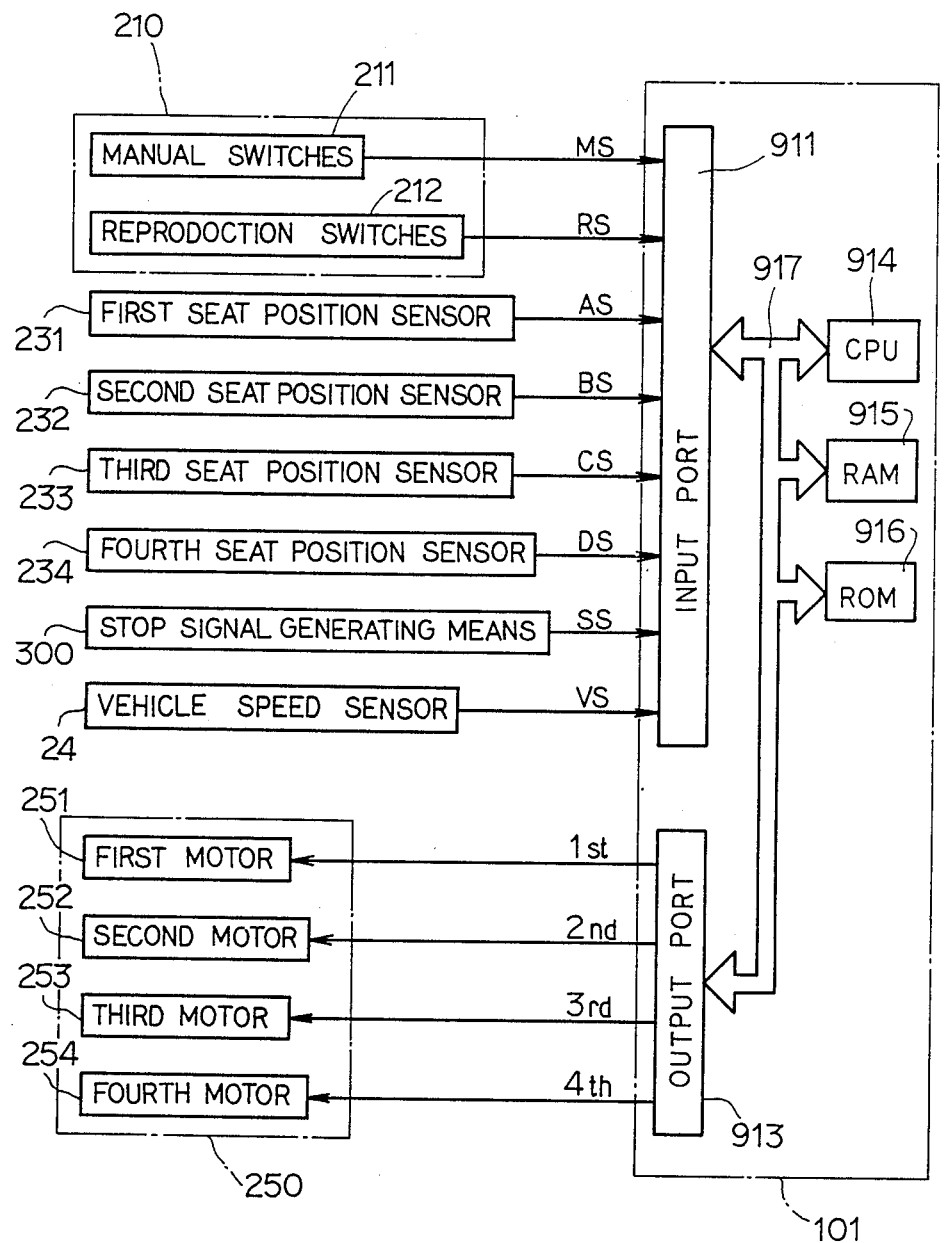
FIG. 8 is a circuit diagram of the electric control unit employed in the second embodiment.

FIGS. 7 and 8 show an automatic seat position adjusting assembly of a second embodiment according to the present invention. The second embodiment is very similar to the first embodiment shown in FIGS. 1 through 6. A difference is in an electric control unit "ECU" 101. The "ECU" 101 includes an input port 911, a central processing unit "CPU" 914, a random access memory "RAM" 915, a read only memory "ROM" 916, and an output port 913. A common bus 917 connects between the input and output ports 911 and 913, the CPU 914, the RAM 915 and the ROM 916.

Operation signals "MS", reproduction signals "RS", a first signal "AS", a second signal "BS", a third signal "CS", a fourth signal "DS", a stop signal "SS" and a vehicle speed signal "VS" are inputted into the input port 911.

The "CPU" 914 carries out logic processing function, and the RAM 915 temporarily stores calculated data of the "CPU" 914 and selected seat positions. The "ROM" 916 stores a predetermined control program.

The output port 913 outputs a logic level "1" first through fourth signals to the first through fourth motors 251 through 254 of a longitudinal seat adjusting mechanism 721, a seat reclining adjuster 711, a front portion lifting mechanism 724 and a rear portion lifting mechanism 725 of the automatic seat position adjusting assembly.

Figure 9:
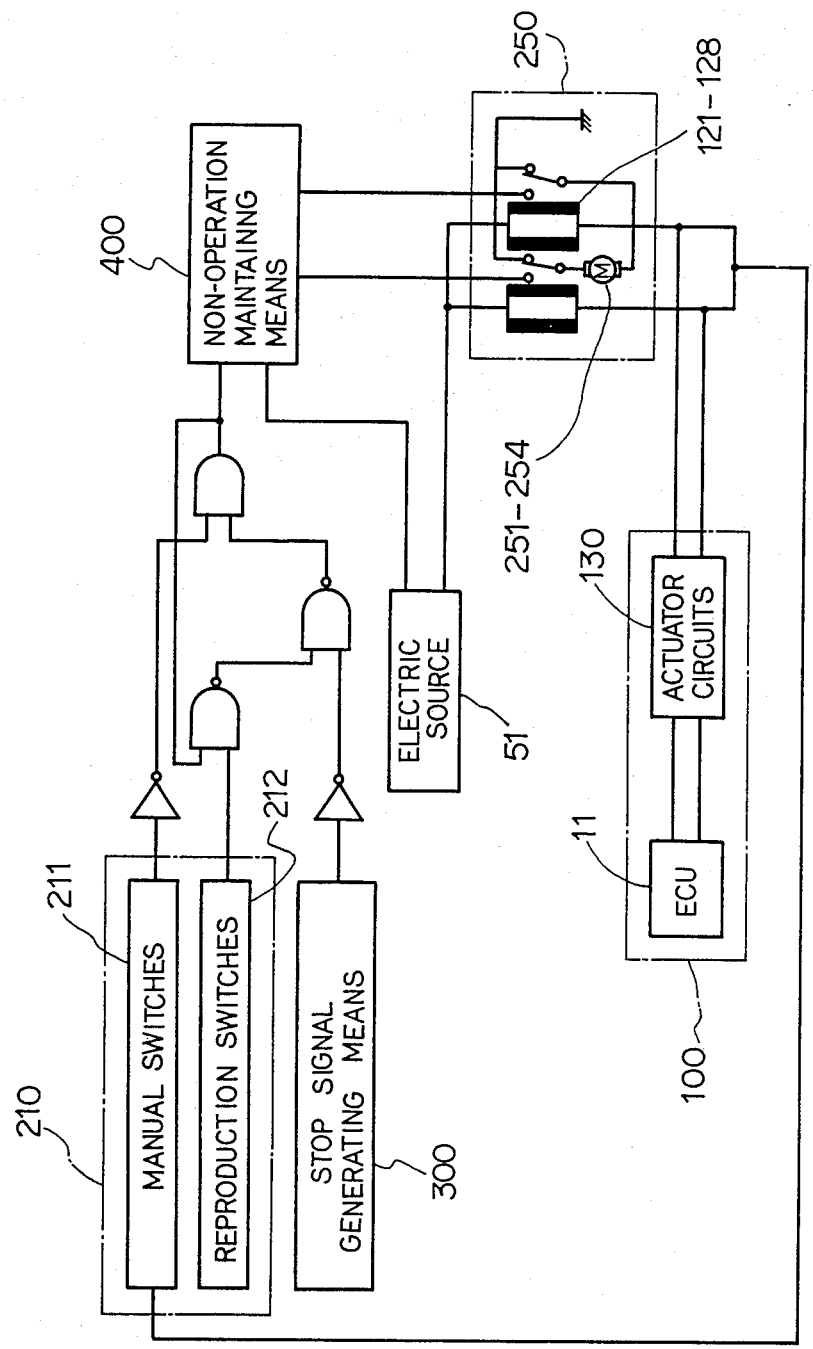
FIG. 9 is a logic diagram of a third embodiment according to the present invention.

FIG. 9 shows an automatic seat position adjusting assembly of a third embodiment according to the present invention.

The third embodiment is very similar to the first embodiment shown in FIGS. 1 through 6. A difference is in a relationship among an actuator means 250, a non-operation maintaining means 400 and an electric source 51.

Second terminals of the first through eighth relays 121 through 128 are electrically connected to the electric source 51 instead of the non-operation maintaining means 400. Fixed terminals of first through eighth relays 121 through 128 are electrically connected to the non-operation maintaining means 400 instead of the electric source 51.

Accordingly, when an electric control unit "ECU" 11 of a controller means 100 outputs a controlling signal to the actuator means 250 (i.e., in a ready condition), the relays 121 through 128 are actuated.

Therefore, when the non-operation maintaining means 400 is in an operation condition and the actuator means 250 is in the ready condition, the fist through fourth motors 251 through 254 are rotated and the automatic seat position adjusting assembly can adjust a seat to a selected seat position.

However, when the non-operation maintaining means 400 is in a non-operation condition, the electric source 51 is not connected to the actuator means 250, so that even when the actuator means 250 is in the ready condition, the automatic seat position adjusting assembly can prevent an adjustment of the seat.

Figure 10:
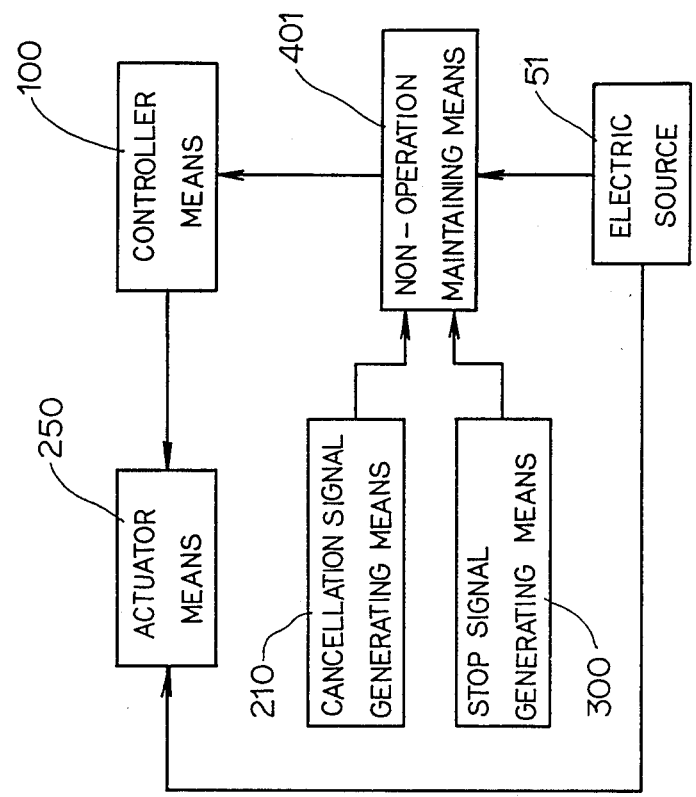
FIG. 10 is a block diagram of a fourth embodiment according to the present invention.
Figure 12:
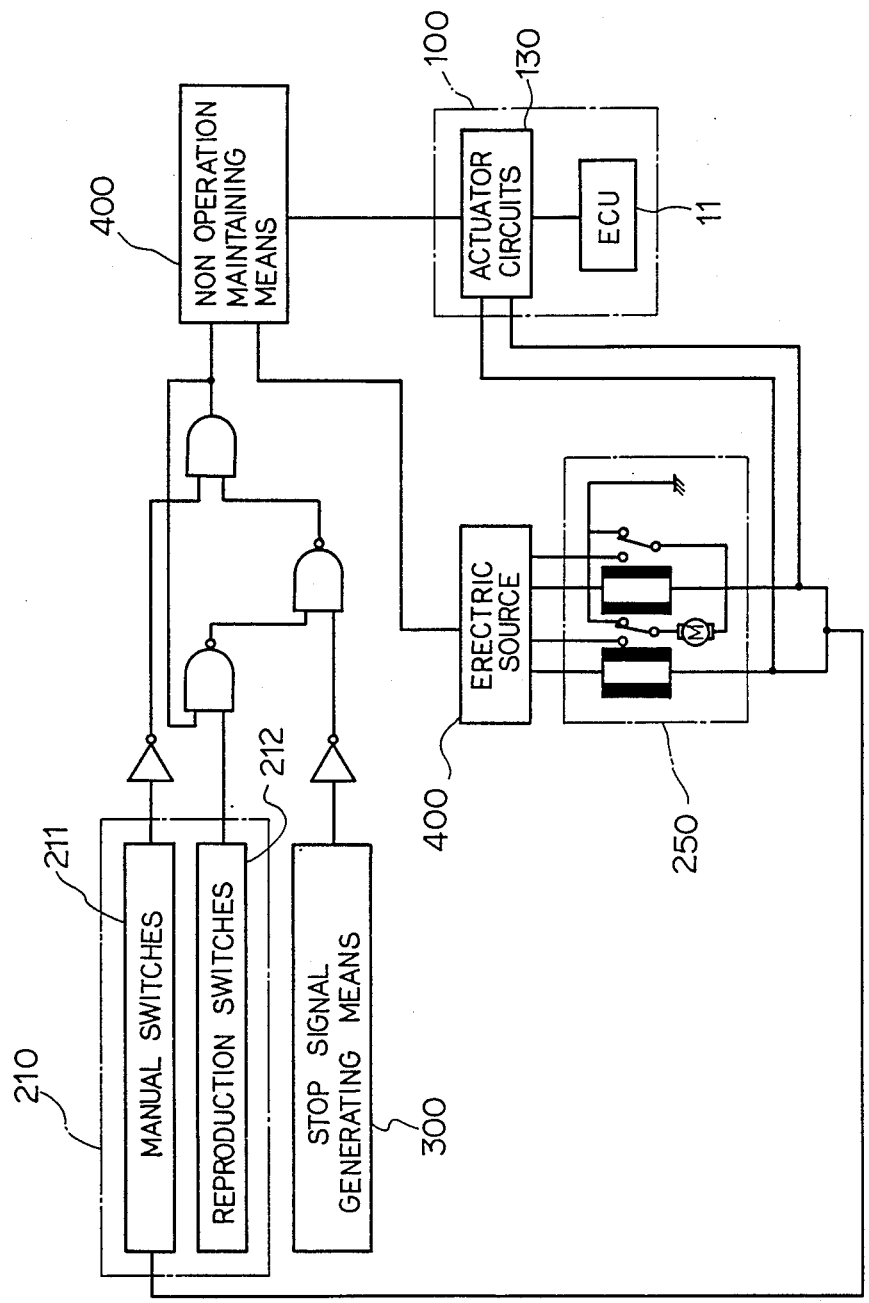
FIG. 12 is a logic diagram of the fourth embodiment according to the present invention.

FIGS. 10 and 12 show an automatic seat position adjusting assembly of a fourth embodiment accordingly to the present invention.

The fourth embodiment is similar to the first embodiment shown in FIGS. 1 through 6. Differences are in relationships among an electric source 51, a non-operation maintaining means 400, a controller means 100 and an actuator means 250.

Figure 11:
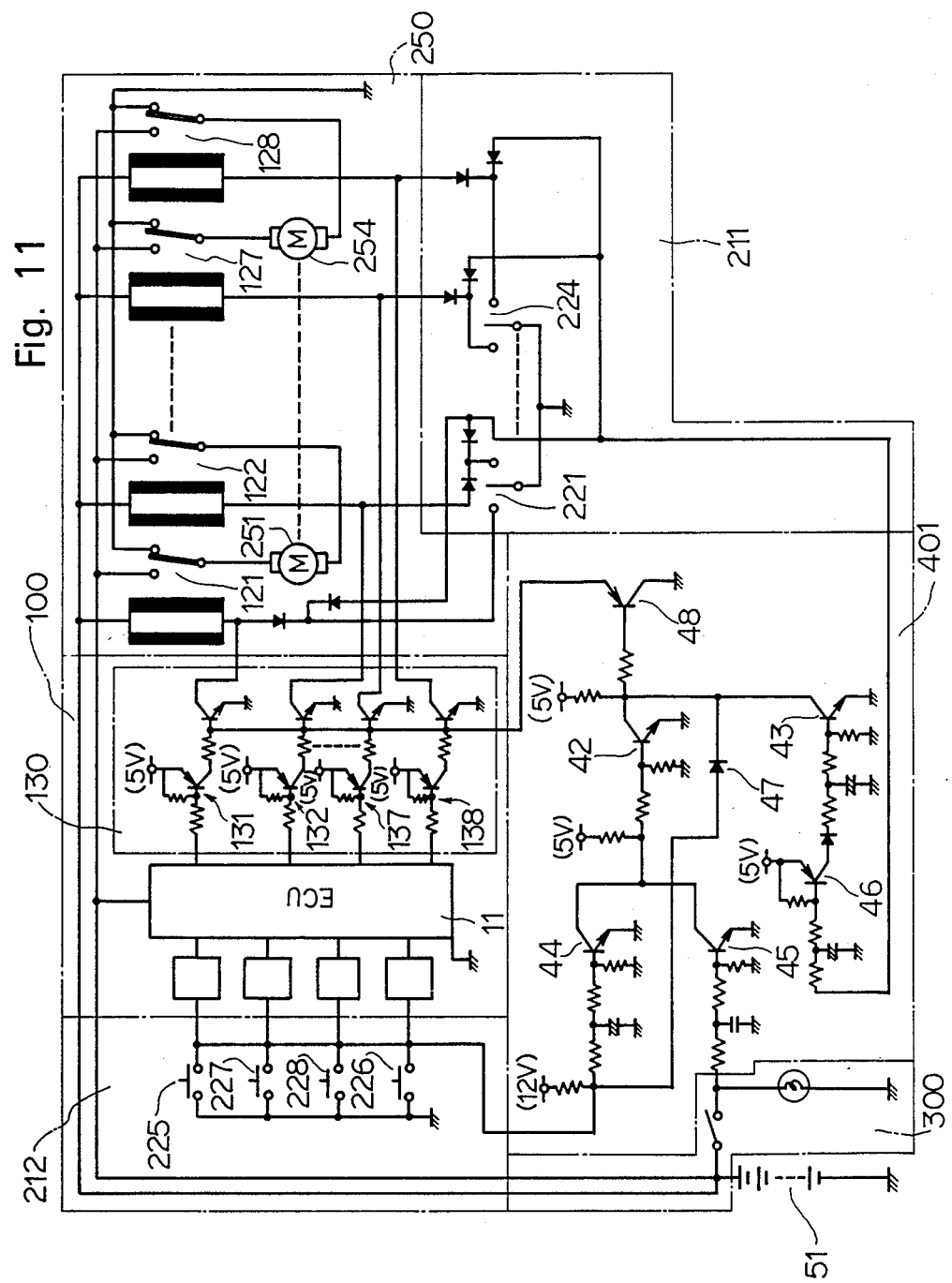
FIG. 11 is a schematic circuit illustrating a control circuit and a non-operation maintaining means of the fourth embodiment according to the present invention.

As shown in FIGS. 10 and 11, the electric source 51 is electrically connected to the actuator means 250 and the non-operation maintaining means 400. The non-operation maintaining means 400 is connected to actuator circuits 130 of the controller means 100 instead of second terminals of the first through eighth relays of the actuator means 250.

Further, the non-operation maintaining means 401 includes an eighth transistor 48 instead of the first transistor 41 of the first embodiment.

Accordingly, even when an electric control unit "ECU" 11 of the controller means 100 outputs a controlling signal to the actuator circuit 130, the relays of the actuator means 250 are not actuated unless the non-operation maintaining means 401 is in a normal-operation condition. When the non-operation maintaining means 401 is in a non-operation condition, the non-operation maintaining means 401 does not supply the electricity with the actuator circuit 130.

As described herein, the present invention overcomes the shortcomings of the known art by providing an automatic seat position adjusting assembly with non-operating maintaining means.

While the present invention has been described in its preferred embodiments, it is to be understood that the invention is not limited thereto, and may be otherwise embodied within the scope of the following claims.

What is claimed is:

1. A seat assembly for automatically adjusting a seat position of a mounted seat comprising:

an actuator means for adjusting the seat;

an electric source for supplying electricity to said actuator means;

a controller means for controlling said actuator means, said controller means outputting a controlling signal to said actuator means;

a non-operation maintaining means for maintaining a non-operation condition of said actuator means, said non-operation maintaining means being electrically connected between said actuator means and said electric source, said non-operation maintaining means selectively supplying electricity with said actuator means;

a stop signal generating means for outputting a stop signal to said non-operation maintaining means, said non-operation for maintaining means begins a maintaining of the non-operation condition of said actuator means in accordance with the receipt of the stop signal, whereby once said stop signal generating means outputs the stop signal to said non-operation maintaining means, said non-operation maintaining means maintains the non-operation condition of said actuator means; and a cancellation signal generating means for outputting a cancellation signal to said non-operation maintaining means, said non-operation maintaining means cancelling the non-operation condition of said actuator means in accordance with the receipt of the cancellation signal, whereby when said cancellation signal generating means outputs the cancellation signal to said non-operation maintaining means, said non-operation maintaining means cancels the non-operation condition of said actuator means, so that said electric source supplies the electricity to said actuator means and said actuator means adjusts the seat in accordance with the controlling signal of said controller means.

2. The seat assembly of claim 1, wherein said actuator means further comprises first through fourth sub-actuator means, said first sub-actuator means for adjusting the seat selectively forwardly and backwardly in a longitudinal direction, said second sub-actuator means for reclining a seat back of the seat selectively forwardly and backwardly, said third sub-actuator means for displacing a front portion of a seat cushion of the seat selectively upwardly and downwardly, said fourth sub-actuator means for displacing a rear portion of the seat cushion selectively upwardly and downwardly.

3. The seat assembly of claim 1, further comprising a selecting means for selecting a suitable seat position of the seat, said selection means being connected to said controller means, whereby when said selection means selects the suitable seat position, said controller means outputs the controlling signal to said actuator means, so that said actuator means adjusts the seat to the selected suitable position.

4. The seat assembly of claim 3, further comprising a reproduction means for memorizing the suitable position selected by said selection means and said reproduction means outputs a reproduction signal corresponding to the selected suitable position, said reproduction means being connected to said controller means, whereby when said reproduction means is operated, said reproduction means outputs the reproduction signal to said controller means, so that said controller means outputs the controlling signal to said actuator means, as a result, said actuator means adjusts the seat to the selected suitable position.

5. A seat assembly of claim 1, wherein said stop signal generating means includes a stop lamp switch.

6. A seat assembly of claim 1, wherein said non-operation maintaining means cancels the non-operation condition of said actuator means in accordance with the receipt of the cancellation signal, even when said stop signal generating means outputs the stop signal to said non-operation maintaining means.

7. A seat assembly for automatically adjusting a seat position of a mounted seat comprising:
an actuator means for adjusting the seat;
a controller means for controlling said actuator means, said controller means outputting a controlling signal to said actuator means;
a non-operation maintaining means for maintaining a non-operation condition of said controller means, said non-operation maintaining means selectively outputting a non-operation signal to said controller means;
a stop signal generating means for outputting a stop signal to said non-operation maintaining means, said non-operation maintaining means begins outputting the non-operation signal to said controller means in accordance with the receipt of the stop signal, whereby once said stop signal generating means outputs the stop signal to said non-operation maintaining means, said non-operation maintaining means maintains the non-operation condition of said controller means; and
a cancellation signal generating means for outputting a cancellation signal to said non-operation maintaining means, said non-operation maintaining means cancelling the non-operation condition of said controller means in accordance with the receipt of the cancellation signal, whereby when said cancellation signal generating means outputs the cancellation signal to said non-operation maintaining means, said non-operation maintaining means cancels the non-operation condition of said actuator means, so that said actuator means adjusts the seat in accordance with the controlling signal of said controller means.

8. The seat assembly of claim 7, further comprising a selection means for selecting a suitable seat position of the seat, said selection means being connected to said controller means, whereby when said selection means selects the suitable seat position, said controller means outputs the controlling signal to said actuator means, so that said actuator means adjusts the seat to the selected suitable position.

9. A seat assembly of claim 7, wherein said non-operation maintaining means cancels the non-operation condition of said actuator means in accordance with the receipt of the cancellation signal, even when said stop signal generating means outputs the stop signal to said non-operation maintaining means.

10. A seat assembly for automatically adjusting a seat position of a mounted seat comprising:
an actuator means for selectively adjusting the seat;
a controller means for controlling said actuator means, said controller means outputting a controlling signal to said actuator means;
a non-operation maintaining means for maintaining a non-operation condition of said actuator means, said non-operation maintaining means being electrically connected to said actuator means, whereby even when said controller means outputs the controlling signal to said actuator means, said actuator means does not adjust the seat, unless said non-operation maintaining means cancels the non-operation condition of said actuator means;
a stop signal generating means for outputting a stop signal to said non-operation maintaining means, said non-operation maintaining means begins a maintaining of the non-operation condition of said actuator means in accordance with the receipt of the stop signal, whereby once said stop signal generating means outputs the stop signal to said non-operation maintaining means, said non-operation maintaining means maintains the non-operation condition of said actuator means; and
a cancellation signal generating means for outputting a cancellation signal to said non-operation maintaining means, said non-operation maintaining means cancelling the non-operation condition of said actuator means in accordance with the receipt of the cancellation signal, whereby when said cancellation signal generating means outputs the canellation signal to said non-operation maintaining means, said non-operation maintaining means cancels the non-operation condition of said actuator means, so that said actuator means adjusts the seat in accordance with the controlling signal of said controller means.

11. The seat assembly of claim 10, wherein said actuator means further comprises first through fourth sub-actuator means, said first sub-actuator means for adjusting the seat selectively forwardly and backwardly in a longitudinal direction, said second sub-actuator means for reclining a seat back of the seat selectively forwardly and backwardly, said third sub-actuator means for displacing a front portion of a seat cushion of the seat selectively upwardly and downwardly, said fourth sub-actuator means for displacing a rear portion of the seat cushion selectively upwardly and downwardly.

12. The seat assembly of claim 10, further comprising a selection means for selecting a suitable seat position of the seat, said selection means being connected to said controller means, whereby when said selection means selects the suitable seat position, said controller means outputs the controlling signal to said actuator means, so that said actuator means adjusts the seat to the selected suitable position.

13. The seat assembly of claim 12, further comprising a reproduction means for memorizing the suitable position selected by said selection means and said reproduction means outputting a reproduction signal corresponding to the selected suitable position, said reproduction means being connected to said controller means, whereby when said reproduction means is operated, said reproduction means outputs the reproduction signal to said controller means, so that said controller means outputs the controlling signal to said actuator means, as a result, said actuator means adjusts the seat to the selected suitable position.

14. A seat assembly of claim 13, wherein said non-operation maintaining means cancels the non-operation condition of said actuator means in accordance with the receipt of the cancellation signal, even when said stop signal generating means outputs the stop signal to said non-operation maintaining means.

15. A seat assembly for automatically adjusting a seat position of a mounted seat comprising:
  an actuator means for selectively adjusting the seat;
  a controller means for controlling said actuator means, said controller means outputting a controlling signal to said actuator means;
  a non-operation maintaining means for maintaining a non-operation condition of said controller means, said non-operation maintaining means being electrically connected to said controller means;
  a stop signal generating means for outputting a stop signal to said non-operation maintaining means, said non-operation maintaining means begins a maintaining of the non-operation condition of said controller means in accordance with the receipt of the stop signal, whereby once said stop signal generating means outputs the stop signal to said non-operation maintaining means, said non-operation maintaining means maintains the non-operation condition of said controller means; and
  a cancellation signal generating means for outputting a cancellation signal to said non-operation maintaining means, said non-operation maintaining means cancelling the non-operation condition of said controller means in accordance with the receipt of the cancellation signal, whereby when said cancellation signal generating means outputs the cancellation signal to said non-operation maintaining means, said non-operation maintaining means cancels the non-operation condition of said controller means, so that said actuator means adjusts the seat in accordance with the controlling signal of said controller means.

16. The seat assembly of claim 15, further comprising an electric source for supplying electricity to said non-operation maintaining means and said actuator means.

17. The seat assembly of claim 16, further comprising a selection means for selecting a suitable seat position of the seat, said selection means being connected to said controller means, whereby when said selection means selects the suitable seat position, said controller means outputs the controlling signal to said actuator means, so that said actuator means adjusts the seat to the selected suitable position.

18. A seat assembly of claim 17, wherein said stop signal generating means includes a stop lamp switch.

19. A seat assembly of claim 18, wherein said non-operation maintaining means cancels the non-operation condition of said actuator means in accordance with the receipt of the cancellation signal, even when said stop signal generating means outputs the stop signal to said non-operation maintaining means.

20. The seat assembly of claim 19, wherein said actuator means further comprises first through fourth sub-actuator means, said first sub-actuator means for adjusting the seat selectively forwardly and backwardly in the longitudinal direction, said second sub-actuator means reclining a seat back of the seat selectively forwardly and backwardly, said third sub-actuator means for displacing a front portion of a seat cushion of the seat selectively upwardly and downwardly, said fourth sub-actuator means for displacing a rear portion of the seat cushion selectively upwardly and downwardly.

* * * * *